Sept. 23, 1952 G. A. STICHT 2,611,543
STOVEPIPE DAMPER
Filed Sept. 20, 1950

Glenn A. Sticht
INVENTOR.

BY *Clarence A. O'Brien
and Harvey B. Jacobson*
Attorneys

Patented Sept. 23, 1952

2,611,543

UNITED STATES PATENT OFFICE 2,611,543

STOVEPIPE DAMPER

Glenn A. Sticht, Missoula, Mont.

Application September 20, 1950, Serial No. 185,860

1 Claim. (Cl. 236—93)

This invention relates to improvements in damper assemblies to be used in stove pipes or in connection with furnaces or heaters.

An object of this invention is to provide an improved thermostatically operative stove pipe damper assembly which is simple in construction, including a damper with a pair of brackets secured thereto, between which one end of a thermostat is adapted to operate for actuation of the damper and including an adjustment for the thermostat.

Ancillary objects and features of importance will become apparent in following the description of the illustrated form of the invention.

Figure 1:
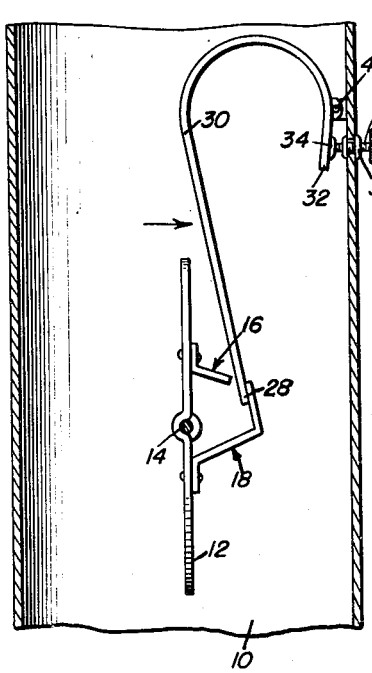
Figure 1 is a longitudinal sectional view of the assembly in a stove pipe, the damper and thermostatic control means being shown in elevation.

For illustrative purposes, there is illustrated a length of stove pipe 10 in which the damper plate 12 is pivoted on the horizontal pivot pin 14. It is understood that the damper plate and the other elements forming the instant invention may be employed in connection with other conventional parts of a furnace, stove, or the like.

Rising from the upper surface of the damper plate 12 is a pair of arms or brackets 16 and 18, respectively. The arm 16 rises almost perpendicular from the upper surface of the plate 12, while the arm or bracket 18 has one portion 20 which converges toward the arm 16 and another portion 22 which is substantially parallel to the upper plane of the plate 12, declining toward the plate 12 only slightly. The outer end 24 of the portion 22 is spaced slightly from the outer end 26 of the arm 16. The arms or brackets thus constructed provide a pocket within which the lower end 28 of the bimetallic thermostat 30 is operable, being passed through the passage defined by the ends 24 and 26 of the arms or brackets, both of which are provided with feet which may be riveted or otherwise rigidly fixed to the plate 12.

The upper end 32 of the thermostat 30 is provided with a seat 34 within which the inner end of the screw 36 is adapted to rotate. This screw is passed through a threaded grommet 38 formed in the pipe 10 whereby, upon rotation of the screw 36, the end 32 of the thermostat is moved inwardly of the stove pipe 10 for adjustment purposes.

A pivot pin 40 is passed through the brackets, one of which is secured to the thermostat 30 and the other of which is secured to the inside surface of the pipe 10, thereby pivotally mounting the thermostat 30 adjacent the set screw receiving end thereof.

In operation, when the flue gases become warm, the thermostat 30 becomes correspondingly warm. This causes the bimetallic thermostat to expand and move as disclosed in Figure 2, pressing the lower end 28 thereof against the bracket 16 and causing the plate 12 to rotate in a clockwise direction to close the damper 12. When the flue gases become very hot, the damper 12 will close fully.

When the flue gases stop passing through the pipe 10, the thermostat 30 will cool, thus causing it to move to the position disclosed in Figure 1. At this time, the lower end 28 thereof presses against the arm or bracket 18, causing the plate 12 to be rotated in the counter-clockwise direction for opening the flue.

To adjust the throw and extent of operation of the thermostat 30, the screw 36 is rotated so that the end of it which contacts the thermostat is moved inwardly or outwardly.

Figure 2:
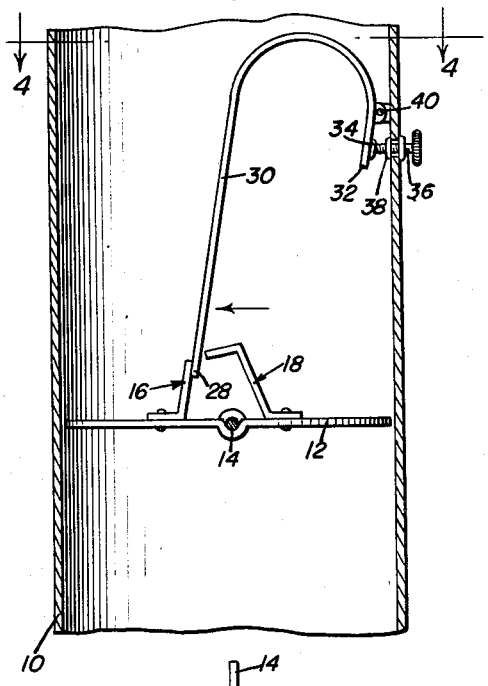
Figure 2 is a view similar to that of Figure 1, the damper and its operating assembly being shown in a different position.
Figure 3:
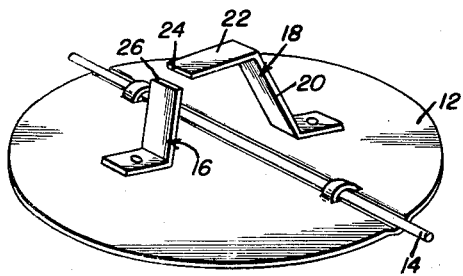
Figure 3 is a perspective view of the damper.
Figure 4:
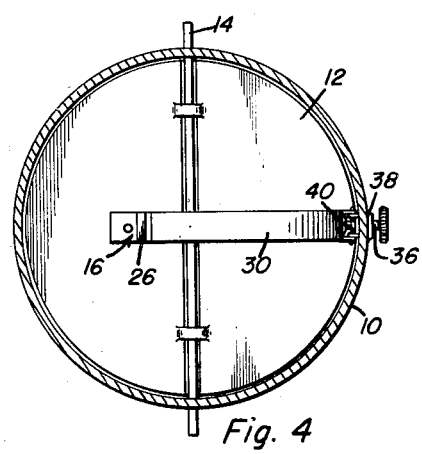
Figure 4 is a transverse sectional view taken substantially on the line 4—4 of Figure 2 and in the direction of the arrows.

The assembly need not necessarily be used as described above. As an alternative, the assembly may be used to operate a check draft by reversing the action of the bimetallic thermostat to open the check draft when flue gases are hot (Figure 1) and close it when the flue gases are cool (Figure 2).

Having described the invention, what is claimed as new is:

A device of the class described comprising a damper journaled in a flue, spaced arms on said damper, a bimetallic thermostat pivotally mounted, at an intermediate point, in the flue adjacent the damper and having one end portion extending between the free end portions of the arms and engageable therewith for opening and closing said damper, and a screw threadedly mounted in the flue and engaged with the other end portion of the thermostat for swingingly adjusting same.

GLENN A. STICHT.

REFERENCES CITED

The following references are of record in the file of this patent:

UNITED STATES PATENTS

| Number | Name | Date |
|---|---|---|
| 1,800,076 | Jaeger | Apr. 7, 1931 |
| 2,171,273 | Cunningham | Aug. 29, 1939 |

FOREIGN PATENTS

| Number | Country | Date |
|---|---|---|
| 698,688 | France | Nov. 28, 1930 |